(12) United States Patent
Olesiewicz et al.

(10) Patent No.: US 7,042,721 B2
(45) Date of Patent: May 9, 2006

(54) ELECTRONIC ASSEMBLY INCLUDING A HOUSING HAVING A ROTATABLE PORTION

(75) Inventors: Timothy W. Olesiewicz, Cupertino, CA (US); Steven J. Furuta, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 263 days.

(21) Appl. No.: 10/668,083

(22) Filed: Sep. 22, 2003

(65) Prior Publication Data

US 2005/0063156 A1    Mar. 24, 2005

(51) Int. Cl.
*H05K 7/20* (2006.01)

(52) U.S. Cl. .................. 361/695; 361/683; 361/686; 361/727; 312/223.2; 454/184

(58) Field of Classification Search ............... 361/683, 361/685, 686–687, 724–727, 816, 818, 752–755, 361/796, 695; 174/35 R, 35 GS, 252; 312/223.1, 312/223.2, 224, 298, 215, 219, 223.3; 400/713, 400/714; 211/41.17, 41.18, 71.01, 72–73; 360/97.01, 97.03, 98.01, 98.08; 411/182, 411/549, 553; 292/8, 30; 454/184
See application file for complete search history.

(56) References Cited

U.S. PATENT DOCUMENTS

| | | | | |
|---|---|---|---|---|
| 5,051,868 A | * | 9/1991 | Leverault et al. | 361/683 |
| 5,351,176 A | * | 9/1994 | Smith et al. | 361/681 |
| 5,398,161 A | * | 3/1995 | Roy | 361/727 |
| 5,495,389 A | * | 2/1996 | Dewitt et al. | 361/683 |
| 5,561,893 A | * | 10/1996 | Lee | 29/434 |
| 5,701,231 A | * | 12/1997 | Do et al. | 361/683 |
| 5,774,337 A | * | 6/1998 | Lee et al. | 361/725 |
| 5,784,251 A | * | 7/1998 | Miller et al. | 361/683 |
| 5,786,995 A | * | 7/1998 | Coleman | 700/83 |
| 5,973,918 A | * | 10/1999 | Felcman et al. | 361/683 |

(Continued)

FOREIGN PATENT DOCUMENTS

GB     2 328 528 A    *    2/1999

(Continued)

OTHER PUBLICATIONS

"Access to the Logic Board in the Desktop Enclosure"; Apple Computer; Aug. 13, 1998.

(Continued)

*Primary Examiner*—Michael Datskovskiy
(74) *Attorney, Agent, or Firm*—Myerstons Hood Kivlin Kowert & Goetzel, P.C.; B. Noël Kivlin; Stephen J. Curran

(57) ABSTRACT

An electronic assembly includes a housing having a first portion and a remaining portion. The first portion includes a surface forming an outer wall of the housing. The electronic assembly also includes a component such as a CD ROM drive, for example, that may be mounted on the first portion of the housing. Further, at least one additional component, such as a motherboard, may be mounted on the remaining portion of the housing. The first portion of the housing is rotatably attached to the remaining portion of the housing. When the first portion of the housing is rotated into a closed position, the component and the additional component are positioned adjacent to each other. However, when the first portion of the housing is rotated into an open position, the component and the additional component are moved away from each other to allow access to the additional component.

20 Claims, 10 Drawing Sheets

U.S. PATENT DOCUMENTS

| | | | |
|---|---|---|---|
| 6,111,754 A * | 8/2000 | Abbott et al. | 361/724 |
| 6,233,152 B1 * | 5/2001 | Abbott et al. | 361/725 |
| 6,392,875 B1 * | 5/2002 | Erickson et al. | 361/683 |
| 6,535,391 B1 * | 3/2003 | Larsen et al. | 361/727 |
| 6,614,651 B1 * | 9/2003 | Chi et al. | 361/683 |
| 6,665,178 B1 * | 12/2003 | Curlee et al. | 361/687 |
| 6,700,776 B1 * | 3/2004 | Bang et al. | 361/683 |
| 6,741,473 B1 * | 5/2004 | Chen | 361/727 |
| 6,741,474 B1 * | 5/2004 | Hung et al. | 361/727 |
| 6,788,542 B1 * | 9/2004 | Rumney | 361/724 |
| 6,922,336 B1 * | 7/2005 | Barsun et al. | 361/683 |

FOREIGN PATENT DOCUMENTS

| | | | |
|---|---|---|---|
| JP | 2001085860 A | * | 3/2001 |

OTHER PUBLICATIONS

"Viking Memory Installation Guide"; Viking Components, Inc.; 1998.

* cited by examiner

ELECTRONIC ASSEMBLY INCLUDING A HOUSING HAVING A ROTATABLE PORTION

BACKGROUND OF THE INVENTION

1. Field of the Invention

This invention relates to computer system components and, more particularly, to electronic assembly housings.

2. Description of the Related Art

Many computer systems include components or electronic assemblies that include a housing or enclosure. During system maintenance, a given component may be serviced by removing one or more covers.

Depending on the level of accessibility and serviceability, a failing component may be serviced either with little effort or in some cases, great difficulty. Further, individual internal components such as a memory module or processor, for example, within a failing component enclosure may need to be serviced or replaced. However, due to component density and internal component positioning, many internal components are difficult to access and even more difficult to remove. This may be true even in some high reliability, accessibility and serviceability (RAS) systems. In some cases, working internal components may be damaged in an effort to remove or access other non-working internal components.

SUMMARY OF THE INVENTION

Various embodiments of an electronic assembly and computer system are disclosed. In one embodiment, the electronic assembly includes a housing including a first portion and a remaining portion. The first portion includes a surface forming an outer wall of the housing. The electronic assembly also includes a component such as a compact disk read only memory (CD ROM) drive, for example, that may be mounted on the first portion of the housing. In addition, at least one additional component such as a motherboard, for example, may be mounted on the remaining portion of the housing. The first portion of the housing is rotatably attached to the remaining portion of the housing. When the first portion of the housing is rotated into a closed position, the component and the additional component are positioned adjacent to each other. However, when the first portion of the housing is rotated into an open position, the component and the additional component are moved away from each other to allow access to the additional component.

Figure 1:
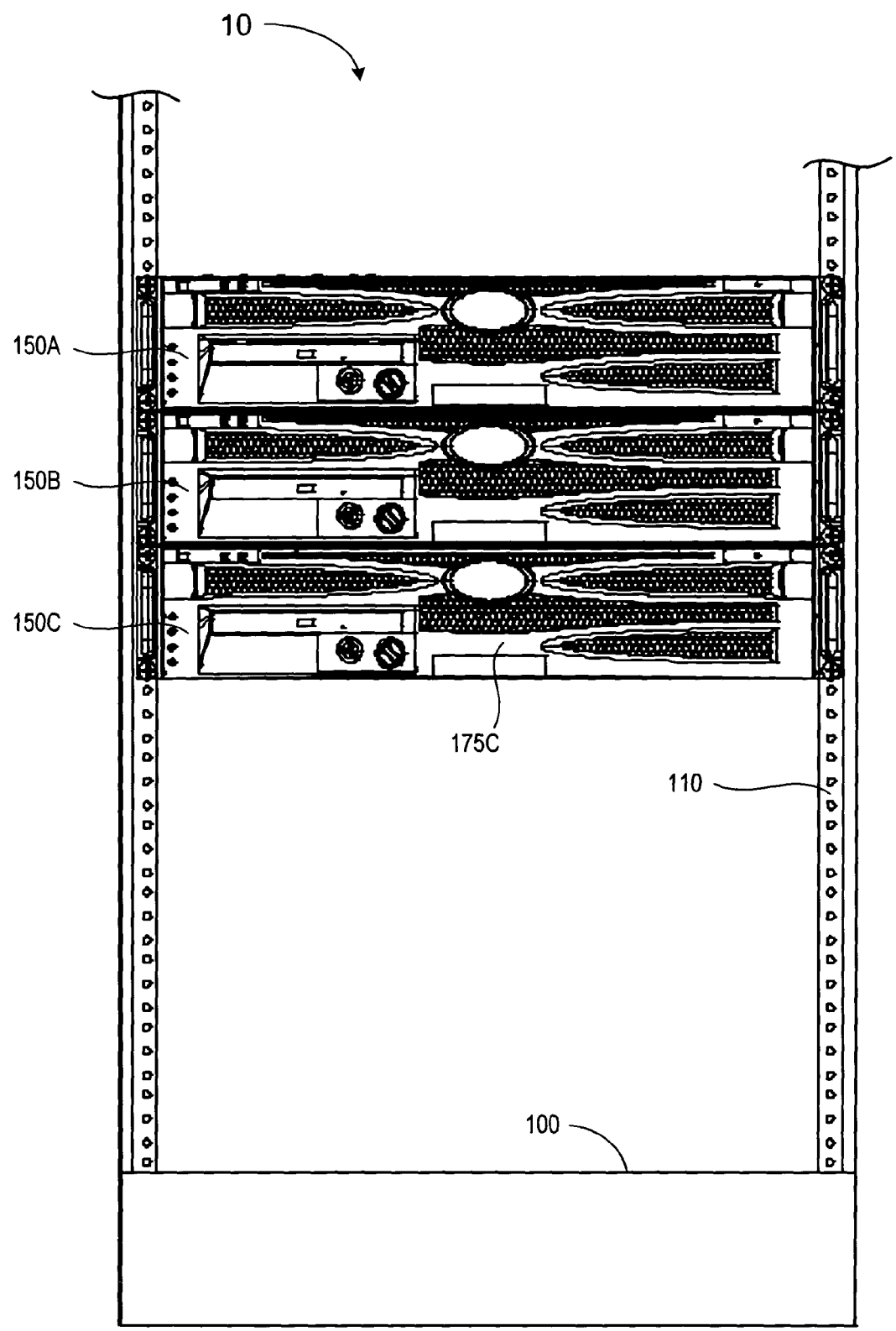
FIG. 1 is a front view drawing of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a front view drawing of one embodiment of a computer system is shown. Computer system 10 includes a system cabinet 100 which houses an equipment rack 110. Equipment rack 110 is configured to receive a plurality of electronic assemblies such as rack-mountable components 150A–150C. It is noted that in various other embodiments, system cabinet 100 may be optional. In such embodiments, equipment rack 110 may be a freestanding unit. It is noted that components having a reference number followed by a letter may be referenced by the reference number alone, where appropriate, for simplicity.

In one embodiment, computer system 10 may be a server system. In such an embodiment, a portion of rack-mountable components 150A–C may be configured as individual server units. In other embodiments, computer system 10 may be any type of computer system. As will be described in greater detail below, each of rack mountable components 150A–C may include a housing (not shown in FIG. 1) that provides a full or partial enclosure and mounting surfaces for various internal components. In addition, one or more of rack-mountable components 150 may include internal components (not shown in FIG. 1) such as a motherboard that may include one or more processors, one or more hard disk drives, a compact disk (CD) and or a digital video disk (DVD) drive and one or more conventional input/output (I/O) buses such as a peripheral component interconnect (PCI) bus, for example.

In one embodiment, a given rack-mountable component 150 may be slidably mounted within the equipment rack 110. In one embodiment, equipment rack 110 may include a backplane (not shown) configured to proved electrical connections to each rack-mountable component 150 when it is inserted into its shelf. In other embodiments, appropriate cabling (not shown) may be used to interconnect rack-mountable components 150.

As will be described in greater detail below in conjunction with the descriptions of FIG. 2 through FIG. 10, if a rack-mountable component 150 needs servicing, the rack-mountable component 150 may be slid out of equipment rack 110. In one embodiment, if the internal components of the rack-mountable component 150 must be accessed for any reason, a top panel (not shown in FIG. 1) of the rack-mountable component 150 may be removed and stowed. In addition, once the top panel is removed, a portion of the housing, which includes a surface 175C that forms an outer wall of the rack-mountable component 150C, may be unfastened and rotated out of the way to provide access to internal components such as the motherboard, for example.

Figure 2:
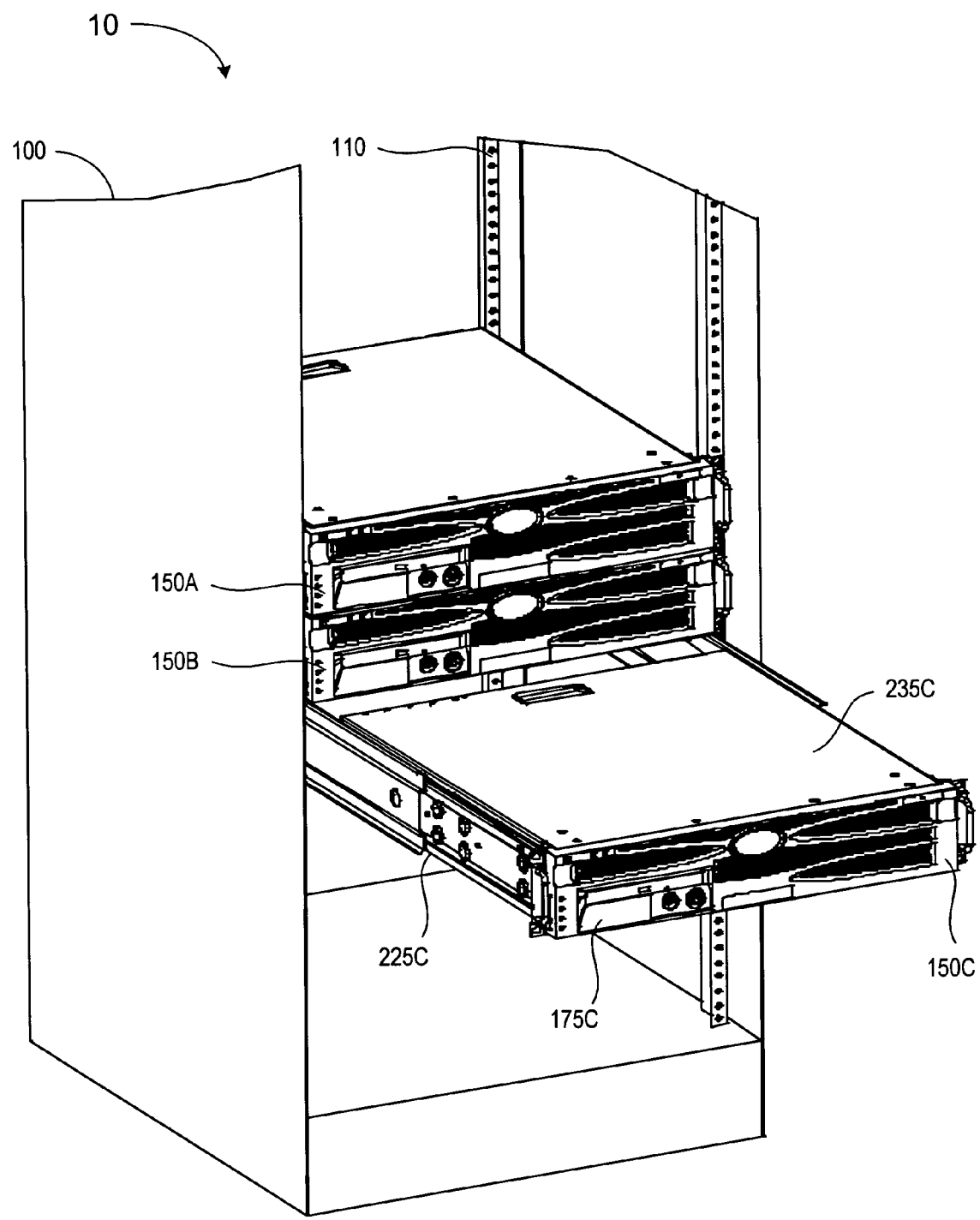
FIG. 2 is a perspective view drawing of one embodiment of the computer system of FIG. 1.
Figure 3:
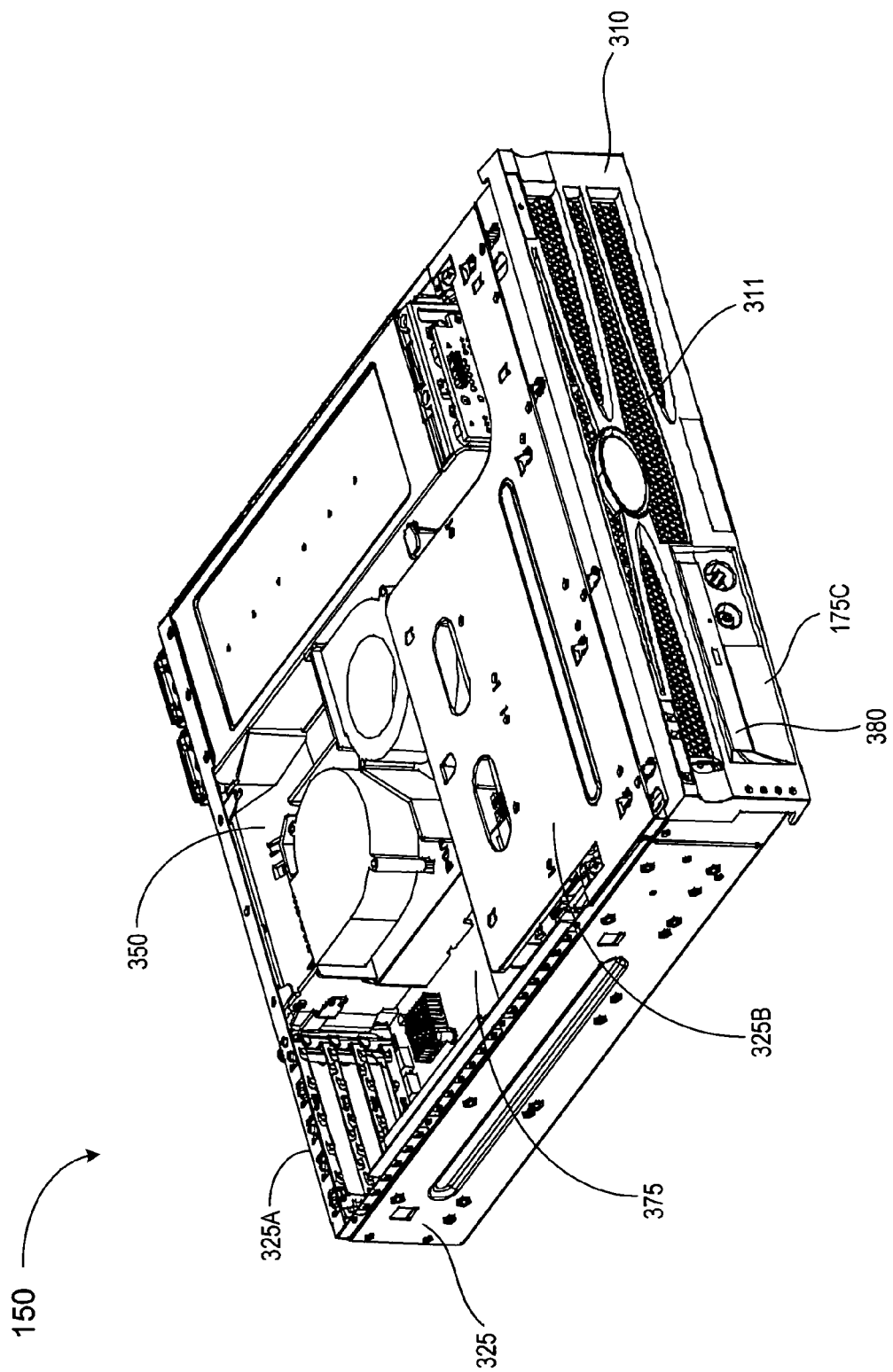
FIG. 3 is a perspective view drawing of one embodiment of a rack-mountable component with its top panel removed.

Referring to FIG. 2, a perspective view drawing of one embodiment of the computer system of FIG. 1 is shown. Components corresponding to those shown in FIG. 1-FIG. 3 are numbered identically for clarity and simplicity. Rack-mountable component 150C is slidably extended out from equipment rack 110. In this position, slide mount 225 is shown attached to one side of rack-mountable component 150C. An additional slide mount (not shown) may also be attached to the right side of rack-mountable component 150C. Further, in the illustrated embodiment, the housing of rack-mountable component 150C includes a top panel 235.

Turning to FIG. 3, a perspective view drawing of one embodiment of a rack-mountable component with its top panel removed is shown. Components corresponding to those shown in FIG. 1-FIG. 3 are numbered identically for clarity and simplicity. Rack-mountable component 150 includes a housing 325 and various internal components. Housing 325 includes a rotating portion 325B that includes surface 175 and a remaining portion 325A. It is noted that rotating portion 325B is shown in the closed or non-rotated position. In one embodiment, housing 325 may be a metallic material that may provide a rigid, ruggedized enclosure that may also provide electromagnetic interference (EMI) protection. However, it is contemplated that in other embodiments, housing 325 may be made from non-metallic materials.

In the illustrated embodiment, an air duct 350 and a motherboard 375 are mounted to remaining portion 325A.

In the illustrated embodiment, surface 175C, which forms the front outer wall of housing 325, also includes a bezel 310. In the illustrated embodiment, bezel 310 includes a plurality of air inlet holes 311 that may allow cooling air to pass though bezel 310 and into housing 325 during operation. In one embodiment, bezel 310 maybe made from plastic or other non-metallic materials.

As will be described in greater detail below, the rotating portion 325B may also have internal components mounted to it. For example, a CD ROM drive access door 380 is shown in FIG. 3. Thus, a CD ROM drive is mounted to the rotating portion 325B.

It is noted that when the rotating portion 325B is in the closed position, the internal components (e.g., CD ROM drive) that are mounted to the rotating portion 325B are adjacent to the components mounted to the remaining portion 325A of housing 325. In this closed position, rotating portion 325B may partially or completely obscure the components (e.g., motherboard 375 and air duct 350) mounted to remaining portion 325A and the internal components (e.g., CD ROM drive) that are mounted to the rotating portion 325B; thereby making it difficult or impossible to access any of the internal components.

Figure 4:
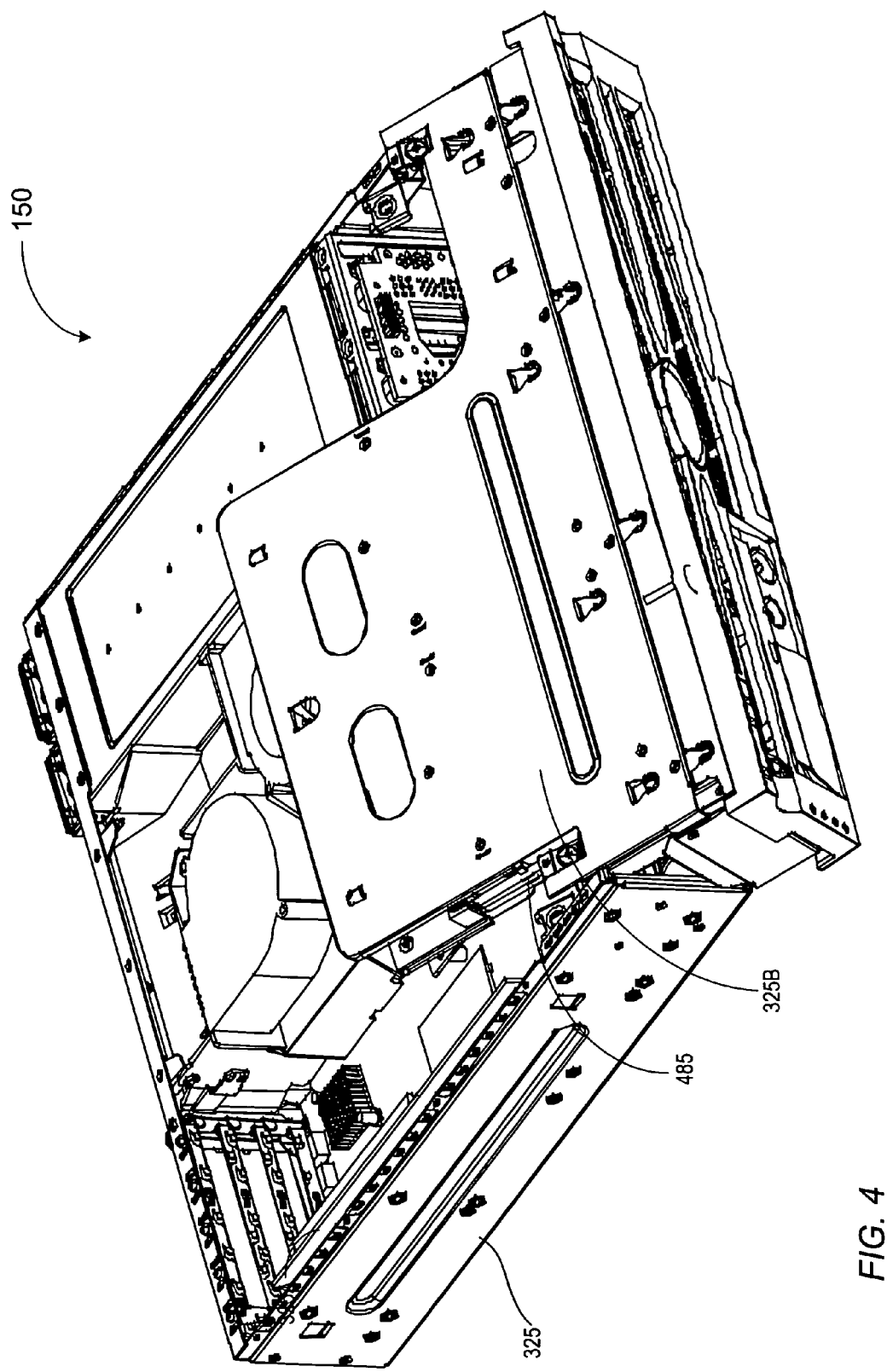
FIG. 4 is a perspective view drawing of the rack-mountable component of FIG. 3 with its top panel removed and the rotatable portion of the housing partially rotated.

Referring to FIG. 4, a perspective view drawing of the rack-mountable component of FIG. 3 is shown. Components corresponding to those shown in FIG. 1-FIG. 3 are numbered identically for clarity and simplicity. In this view, top panel 235 (not shown in FIG. 4) of rack-mountable component 150 is removed and rotating portion 325B is partially rotated. It is noted that as rotating portion 325B is rotated away from remaining portion 325A, the internal components (e.g., motherboard 375 and air duct 350) mounted to remaining portion 325A and the internal components (e.g., CD ROM drive 485) that are mounted to the rotating portion 325B are becoming accessible.

Figure 5:
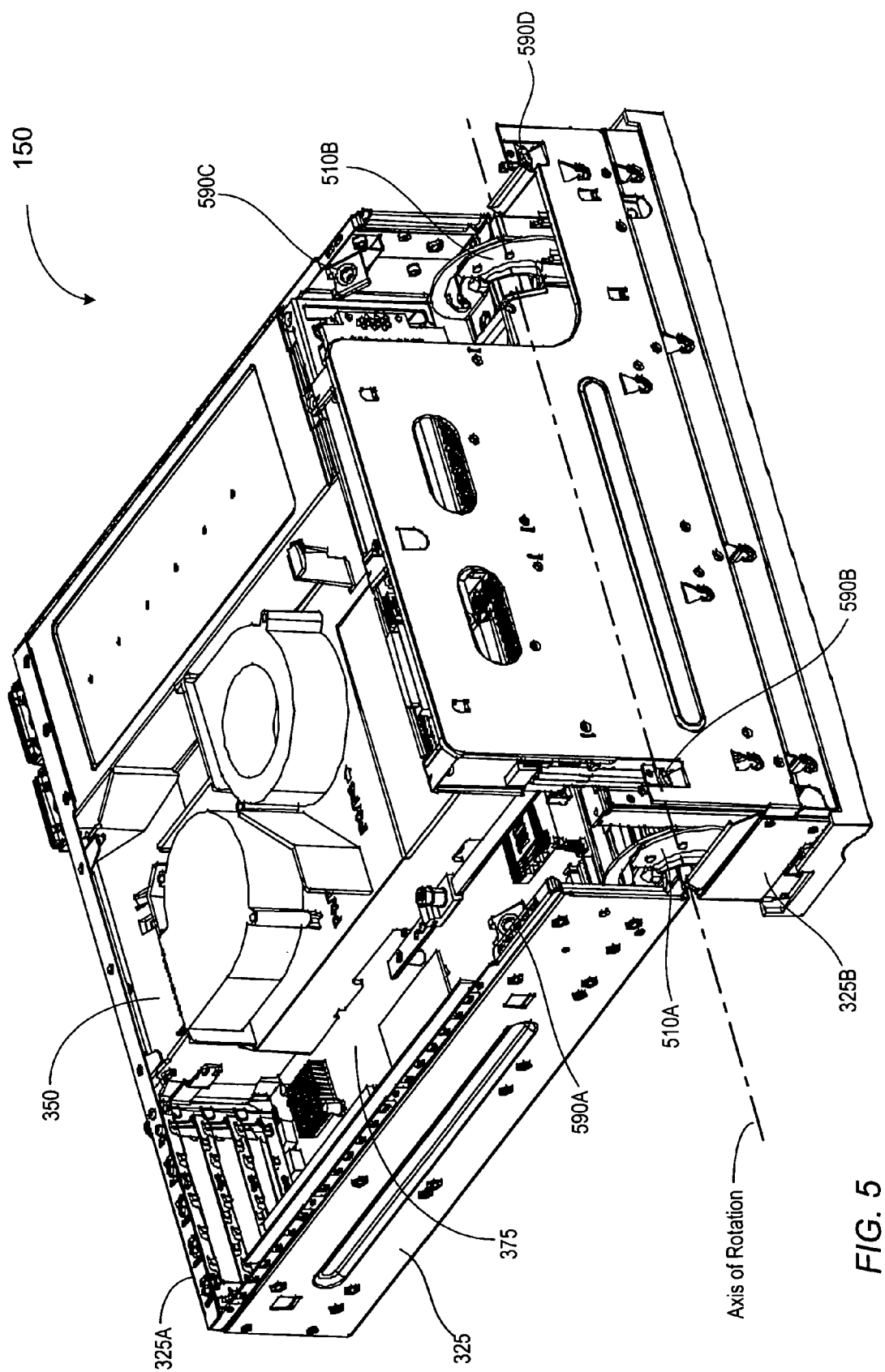
FIG. 5 is a perspective view drawing of the rack-mountable component of FIG. 3 with its top panel removed and the rotatable portion of the housing fully rotated.

Turning to FIG. 5, another perspective view drawing of the rack-mountable component of FIG. 3 is shown. Components corresponding to those shown in FIG. 1–FIG. 4 are numbered identically for clarity and simplicity. In this view, top panel 235 (not shown in FIG. 5) rack-mountable component 150 is removed and the rotatable portion 325B is fully rotated to an open position. In the illustrated embodiment, rotatable portion 325B is rotatably attached to remaining portion 325A by a hinge 510A and a hinge 510B. Although it is noted that in other embodiments, other types of mechanisms may be used to rotatably attach rotatable portion 325B to remaining portion 325A.

In the illustrated embodiment, hinge 510 causes rotatable portion 325B to rotate about an axis of rotation that allows rotatable portion 325B to rotate down substantially 90 degrees. However, in another embodiment, it is contemplated that a the hinging mechanism may be attached to allow rotatable portion 325B to be rotated up substantially 90 degrees. It is further contemplated that the hinging mechanism (not shown) may be attached such that the axis of rotation may allow rotatable portion 325B to be rotated right or left substantially 90 degrees. It is noted that in other embodiments, it is contemplated that when in an open position, rotatable portion 325B may rotate to angles other than 90 degrees.

It is noted that in the open position, the internal components (e.g., motherboard 375 and air duct 350) mounted to remaining portion 325A and the components (e.g., CD ROM drive 485) that are mounted to the rotating portion 325B may now be accessed.

In the illustrated embodiment, rack-mountable component 150 includes a fastening mechanism 590 that secures rotatable portion 325B to remaining portion 325A when rotatable portion 325B is in the closed position. Fastening mechanism 590 includes a pair of quarter-turn fasteners 590B and 590D that mate with a respective pair of quarter-turn receivers 590A and 590C. It is noted that in other embodiments, other types of fasteners may be used.

Figure 6:
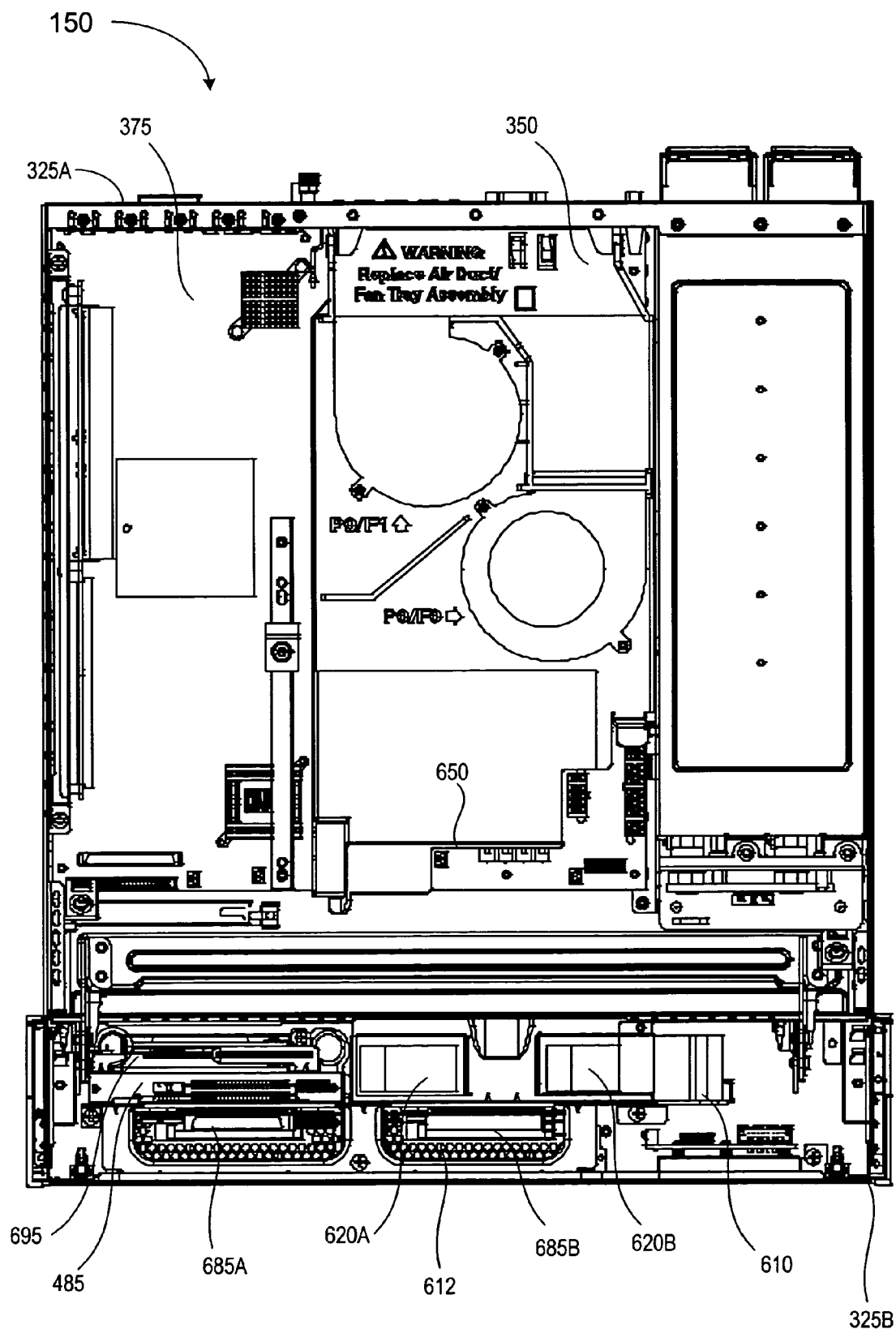
FIG. 6 is a top view drawing of the rack-mountable component of FIG. 3 with its top panel removed and the rotatable portion of the housing fully rotated.

Referring to FIG. 6, a top view drawing of the rack-mountable component of FIG. 3 is shown. Components corresponding to those shown in FIG. 1–FIG. 5 are numbered identically for clarity and simplicity. In this view, top panel 235 (not shown in FIG. 6) of rack-mountable component 150 is removed and rotatable portion 325B is fully rotated to the open position allowing access and visibility to the various internal components. For example, in addition to CD ROM drive 485, rotatable portion 325B may also include other components such as hard disk drives 685A and 685B and a card reader unit 695.

In the illustrated embodiment, rack-mountable component 150 includes an air-moving device 610 that includes a pair of blower fans and a pair of corresponding output ports designated 620A and 620B. In one embodiment, air moving 610 device may include one or more a blower fans. In addition, air duct 350 includes an air intake port designated 650. When rotatable portion 325B is in the closed position, output ports 620A and 620B line up with and mate to air intake port 650. During operation of the electronic assembly, air-moving device 610 draws cooling air through both the air intake holes 311 in bezel 310 and the air intake holes 612 located in front surface 175 and forces the cooling air into air duct 350 through air intake port 650. The air flows over motherboard 375 and is exhausted through ventilation openings (not shown) in the back of housing 325. This flow of cooling air is designed to cool one or more processors (not shown) that may be mounted to motherboard 375 and positioned under air duct 350. In one embodiment, air duct 350 may be removed to allow access to the processors.

Figure 7:
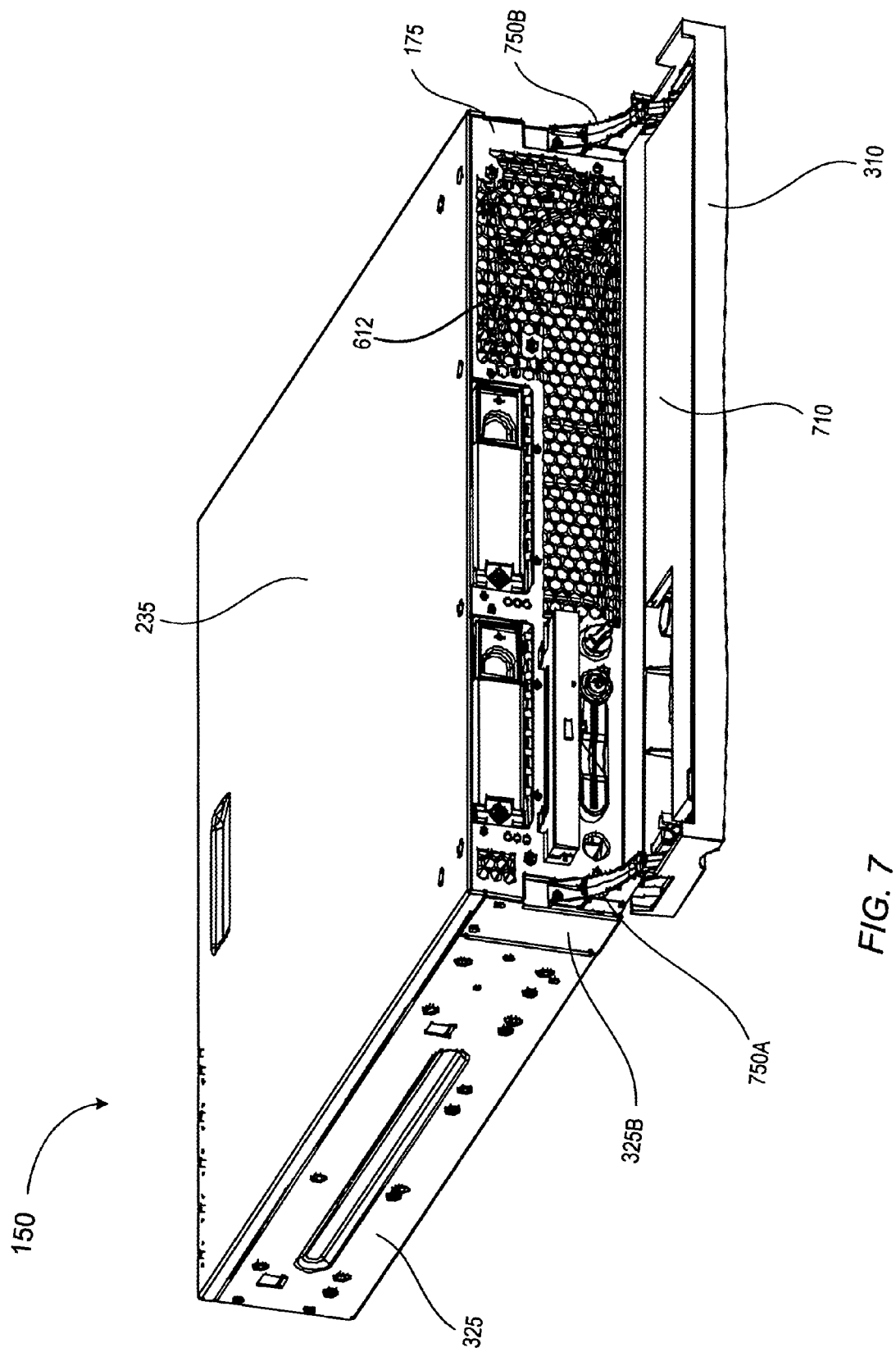
FIG. 7 is a perspective view drawing of the rack-mountable component of FIG. 3 with its top panel removed and the bezel rotated to an open position.

Turning to FIG. 7, another perspective view drawing of the rack-mountable component of FIG. 3 is shown. Components corresponding to those shown in FIG. 1–FIG. 6 are numbered identically for clarity and simplicity. In this view, bezel 310 is rotated into an open position. In one embodiment, bezel 310 includes a removable air filter 710 that is positioned between air intake holes 311 and air intake holes 612 located in front surface 175. Rotating bezel 310 to the open position may allow access to air filter 710.

In the illustrated embodiment, bezel 310 is rotatably attached to rotatable portion 325B using a pair of hinge mechanisms designated 750A and 750B. Although it is contemplated that in other embodiments, different mechanisms may be used to rotatably attach bezel 310 to rotatable portion 325B.

Figure 8:
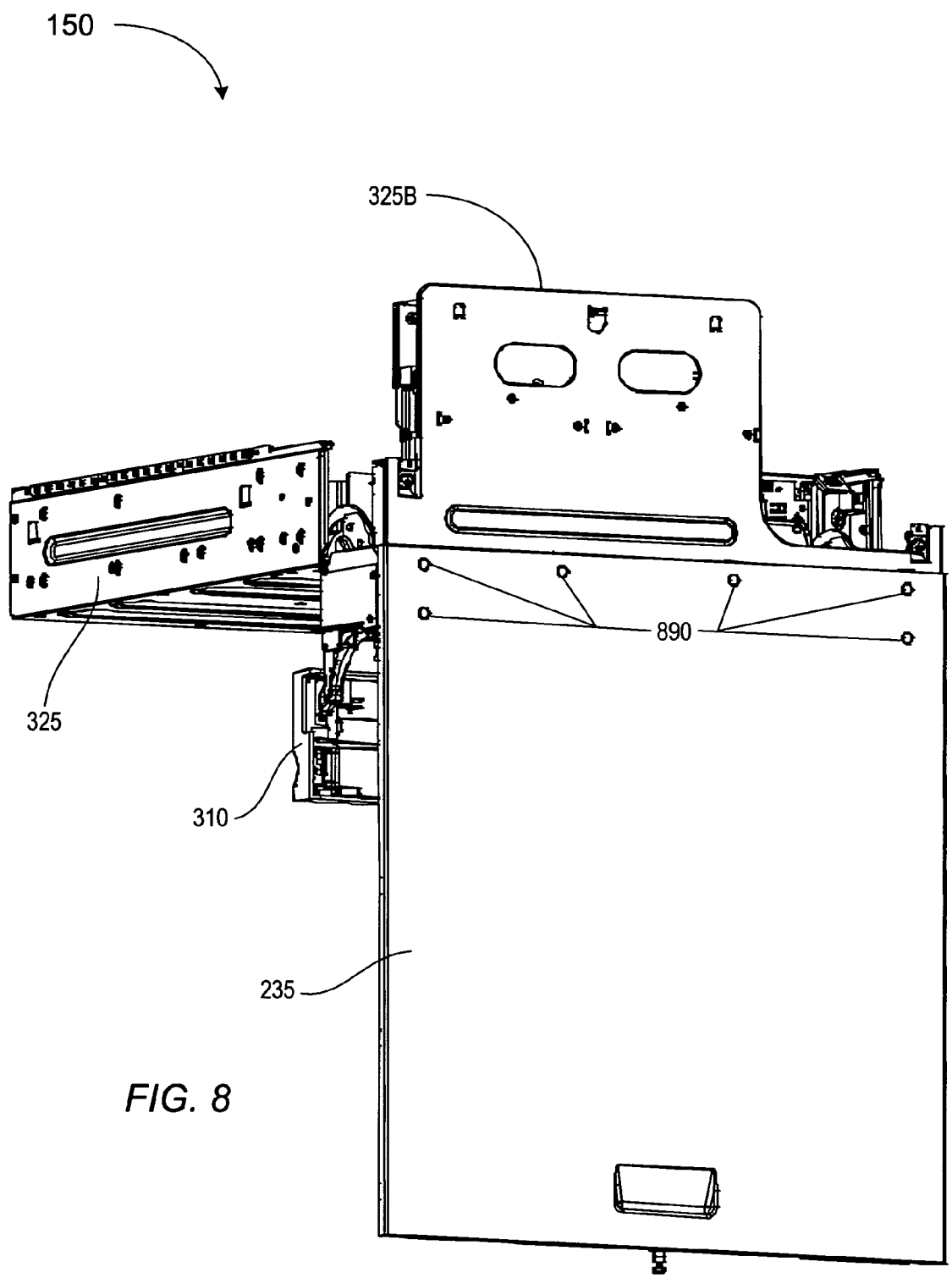
FIG. 8 is a perspective view drawing of the rack-mountable component of FIG. 3 with its top panel removed, the rotatable portion of the housing fully rotated, the bezel rotated to an open position and the top panel stowed in a down position.
Figure 9A:
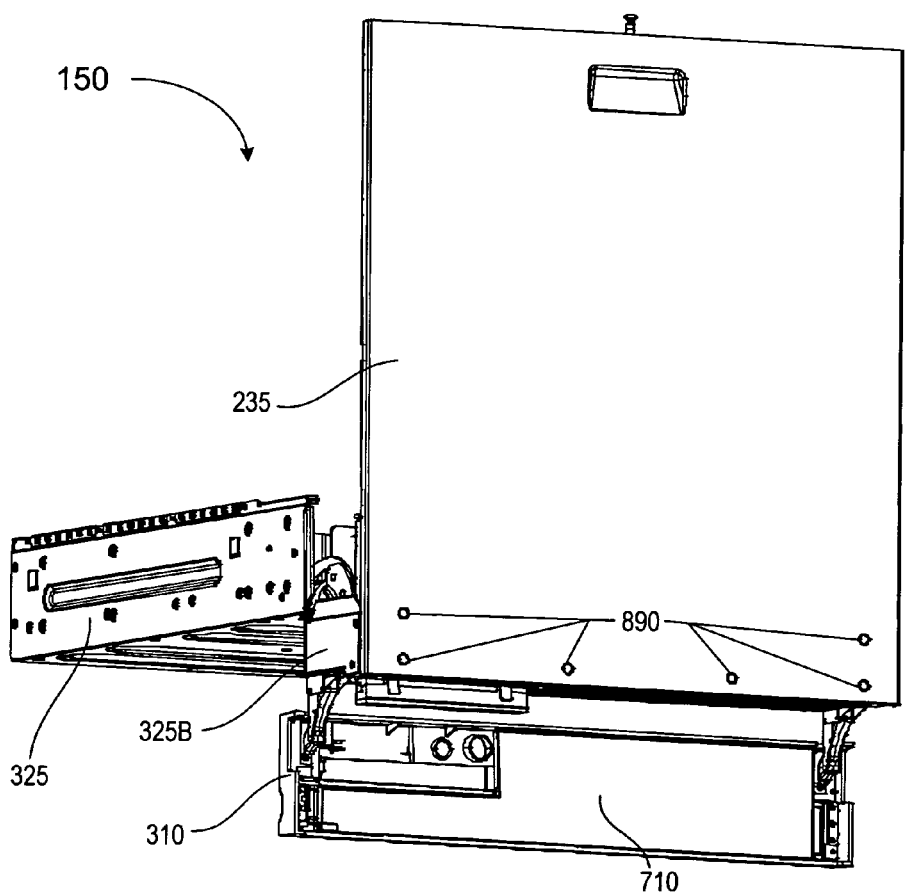
FIG. 9A is a perspective view drawing of the rack-mountable component of FIG. 3 with its top panel removed, the rotatable portion of the housing fully rotated, the bezel rotated to an open position and the top panel stowed in an up position.
Figure 9B:
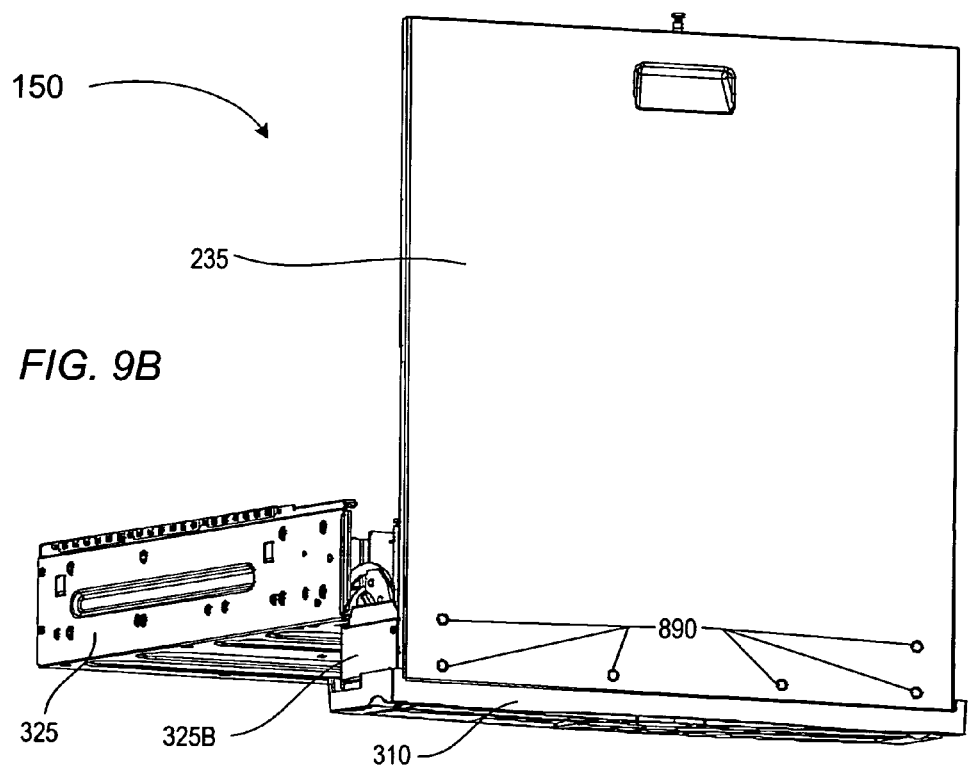
FIG. 9B is a perspective view drawing of the rack-mountable component of FIG. 3 with its top panel removed, the rotatable portion of the housing fully rotated and the top panel stowed in an up position.

In FIG. 8, FIG. 9A and FIG. 9B, perspective view drawings of the rack-mountable component of FIG. 3 are shown. Components corresponding to those shown in FIG. 1-FIG. 7 are numbered identically for clarity and simplicity. In FIG. 8, top panel 235 of housing 325 is removed, rotatable portion 325B is rotated into an open position, bezel 310 is rotated into an open position and the top panel is stowed in a down position. As will be described in greater detail below in conjunction with the description of FIG. 10, top panel 235 is stowed using a pin and slot mechanism 890.

In FIG. 9A, top panel 235 of housing 325 is removed, rotatable portion 325B is rotated into an open position, bezel 310 is rotated into an open position and the top panel is stowed in an up position using the pin and slot stowing mechanism.

In FIG. 9B, top panel 235 of housing 325 is removed, rotatable portion 325B is rotated into an open position, bezel 310 is rotated into a closed position and the top panel is stowed in an up position using the pin and slot stowing mechanism.

Figure 10:
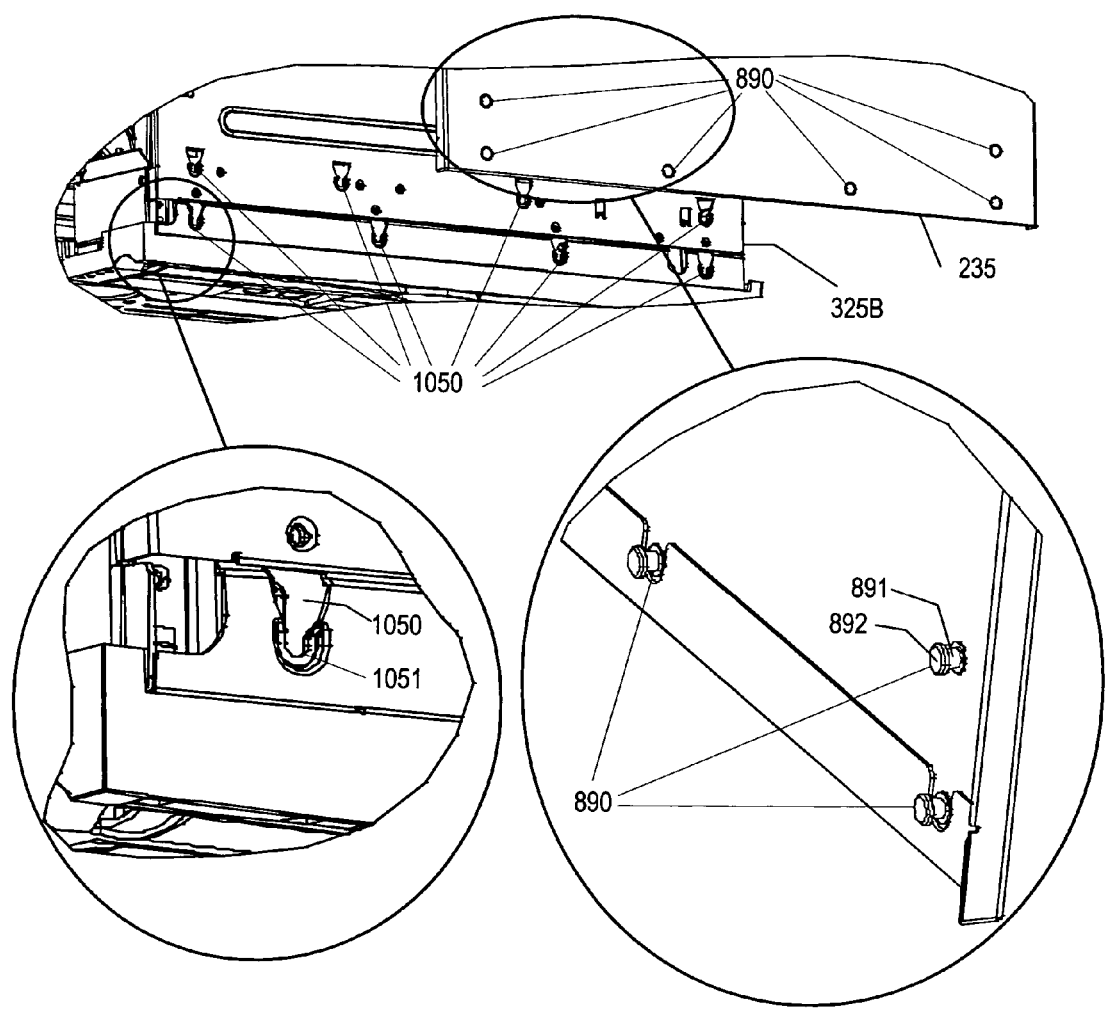
FIG. 10 is an exploded view drawing of one embodiment of the top panel stowing mechanism of FIG. 8 through FIG. 9B.

Turning to FIG. 10, an exploded view drawing of one embodiment of the top panel stowing mechanism of FIG. 8 through FIG. 9B is shown. Top panel 235 includes several stowage pins 890. Each stowage pin 890 includes a cylindrical body 891 with a flanged end 892. Stowage pins 890 are configured to slidably inset into respective stowage slots 1050 positioned on rotatable portion 325B. Each stowage slot 1050 is tapered and includes a lip 1051 configured to capture flanged end 892 of each stowage pin 890. Thus, when stowage pin 890 is inserted and slid into a stowage slot 1050, lip 1051 holds flange end 892 from pulling out and gravity tends to keep top panel 235 in place.

It is noted that although the electronic assembly has been described in the context of rack-mountable component 150 of a computer system, it is contemplated that any electronic assembly including a stand-alone computer system or module may include the features described above in conjunction with the descriptions of FIG. 1–10. Particularly, any electronic assembly may include a housing having a rotatable portion and a remaining portion, where, in an open position, the rotatable portion may provide access to internal components that are usually obscured in a closed position.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An electronic assembly comprising:
   a housing including a first portion having a surface forming an outer wall of said housing, wherein said first portion of said housing is rotatably attached to a remaining portion of said housing;
   a component mounted on said first portion of said housing; and
   at least one additional component mounted on said remaining portion of said housing;
   wherein when said first portion of said housing is rotated into a closed position, said component and said at least one additional component are positioned adjacent to each other;
   wherein when said first portion of said housing is rotated into an open position, said component and said at least one additional component are moved away from each other to allow access to said at least one additional component; and
   wherein said first portion of said housing includes a bezel including a removable air filter, wherein said bezel is rotatably hinged to said surface of said first portion of said housing, wherein said bezel includes a plurality of air inlet holes that allow cooling air to pass through said bezel.

2. The electronic assembly as recited in claim 1, wherein said first portion of said housing is rotatably attached to said remaining portion of said housing via a hinge mechanism.

3. The electronic assembly as recited in claim 1, wherein said at least one component includes a motherboard.

4. The electronic assembly as recited in claim 3 further comprising an air duct mounted to said remaining portion of said housing and positioned to enclose a portion of said motherboard and to channel cooling air and across said motherboard.

5. The electronic assembly as recited in claim 4 further comprising an air moving device mounted to said first portion of said housing and positioned to pull cooling air through said plurality of air inlet holes and to force said cooling air into said air duct.

6. The electronic assembly as recited in claim 5, wherein when said first portion of said housing is rotated to said open position, said air duct is accessible.

7. The electronic assembly as recited in claim 5, wherein said air moving device includes an outlet port, wherein when said first portion of said housing is rotated to said closed position, said outlet port is positioned to mate to an intake port of said air duct.

8. The electronic assembly as recited in claim 1, wherein said housing further includes a top surface.

9. The electronic assembly as recited in claim 8, wherein said top surface is a removable panel.

10. The electronic assembly as recited in claim 9, wherein said removable panel includes a plurality of stowage pins positioned on a bottom surface of said removable panel, wherein when said removable panel is removed from said top surface of said housing and when said first portion of said housing is rotated into said open position, at least some of said stowage pins are configured to slidably insert into a plurality of stowage slots positioned on a surface of said first portion of said housing, thereby allowing said removable panel to be stowed.

11. The electronic assembly as recited in claim 1, wherein said first portion of said housing is configured to rotate substantially ninety degrees from said closed position to said open position.

12. The electronic assembly as recited in claim 1, wherein when rotated to said closed position, said first portion of said housing is secured to said remaining portion of said housing via a pair of fasteners.

13. A computer system comprising:
an equipment rack;
one or more electronic assemblies each configured to mount within said equipment rack, wherein each of said one or more electronic assemblies includes:
a housing including a first portion having a surface forming an outer wall of said housing, wherein said first portion of said housing is rotatably attached to a remaining portion of said housing;
a component mounted on said first portion of said housing, wherein said at least one component includes a motherboard; and
at least one additional component mounted on said remaining portion of said housing;
wherein when said first portion of said housing is rotated into a closed position, said component and said at least one additional component are positioned adjacent to each other;
wherein when said first portion of said housing is rotated into an open position, said component and said at least one additional component are moved away from each other to allow access to said at least one additional component; and
wherein said electronic assembly further comprising an air duct mounted to said remaining portion of said housing and positioned to enclose a portion of said motherboard and to channel cooling air and across said motherboard.

14. The computer system as recited in claim 13, wherein said first portion of said housing is rotatably attached to said remaining portion of said housing via a hinge mechanism.

15. The computer system as recited in claim 13, wherein said electronic assembly further comprising an air moving device mounted to said first portion of said housing and positioned to pull cooling air through said plurality of air inlet holes and to force said cooling air into said air duct.

16. The computer system as recited in claim 15, wherein said air moving device includes an outlet port, wherein when said first portion of said housing is rotated to said closed position, said outlet port is positioned to mate to an intake port of said air duct.

17. The computer system as recited in claim 13, wherein said housing further includes a top surface.

18. The computer system as recited in claim 17, wherein said top surface is a removable panel.

19. The computer system as recited in claim 18, wherein said removable panel includes a plurality of stowage pins positioned on a bottom surface of said removable panel, wherein when said removable panel is removed from said top surface of said housing and when said first portion of said housing is rotated into said open position, at least some of said stowage pins are configured to slidably insert into a plurality of stowage slots positioned on a surface of said first portion of said housing, thereby allowing said removable panel to be stowed.

20. The computer system as recited in claim 13, wherein when rotated to said closed position, said first portion of said housing is secured to said remaining portion of said housing via a pair of fasteners.

* * * * *